Dec. 27, 1966 J. W. PERCIVAL 3,294,904

KEYED A.G.C. WITH VARIABLE REACTANCE FOR CONTROL OF KEYING PULSE AMPLITUDE

Filed Aug. 14, 1963

WITNESSES
Bernard R. Giegucz
Leon M. Garman

INVENTOR
Joseph W. Percival
BY V. H. Cleve
ATTORNEY

United States Patent Office 3,294,904

Patented Dec. 27, 1966

3,294,904

KEYED A.G.C. WITH VARIABLE REACTANCE FOR CONTROL OF KEYING PULSE AMPLITUDE

Joseph W. Percival, Colonia, N.J., assignor to Westinghouse Electric Corporation, Pittsburgh, Pa., a corporation of Pennsylvania Filed Aug. 14, 1963, Ser. No. 302,147
5 Claims. (Cl. 178—7.5)

This invention relates to a new and improved automatic gain control circuit and more specifically to an adjustable automatic gain control circuit for a radio frequency receiver.

An object of the invention is to provide an automatic gain control circuit, which has a minimum number of electrical components to develop an automatic gain control signal for a radio frequency receiver.

Another object of the invention is the provision of an adjustable gated automatic gain control circuit to develop an automatic gain control signal for a television receiver.

Still another object of the invention is to provide a new and improved adjustable gated automatic gain control circuit for a television receiver requiring a minimum number of electrical components and electrical connections.

A feature of the invention is the provision of an automatic gain control circuit utilizing a variable reactance to adjust the automatic gain control signal. More specifically, the automatic gain control circuit of the present invention is of the gated type for a television receiver having a gating tube which is turned on by coincidence of horizontal sync pulses and flyback pulses obtained during the retrace interval of the horizontal sweep. In the present invention still more specifically, the automatic gain control signal is varied by a variable reactance between the source of flyback pulses and the automatic gain control tube.

Other features and objects of my invention will be best understood by reference to the following description, taken in conjunction with the accompanying drawing, in which.

Figures 1, 2, 3:
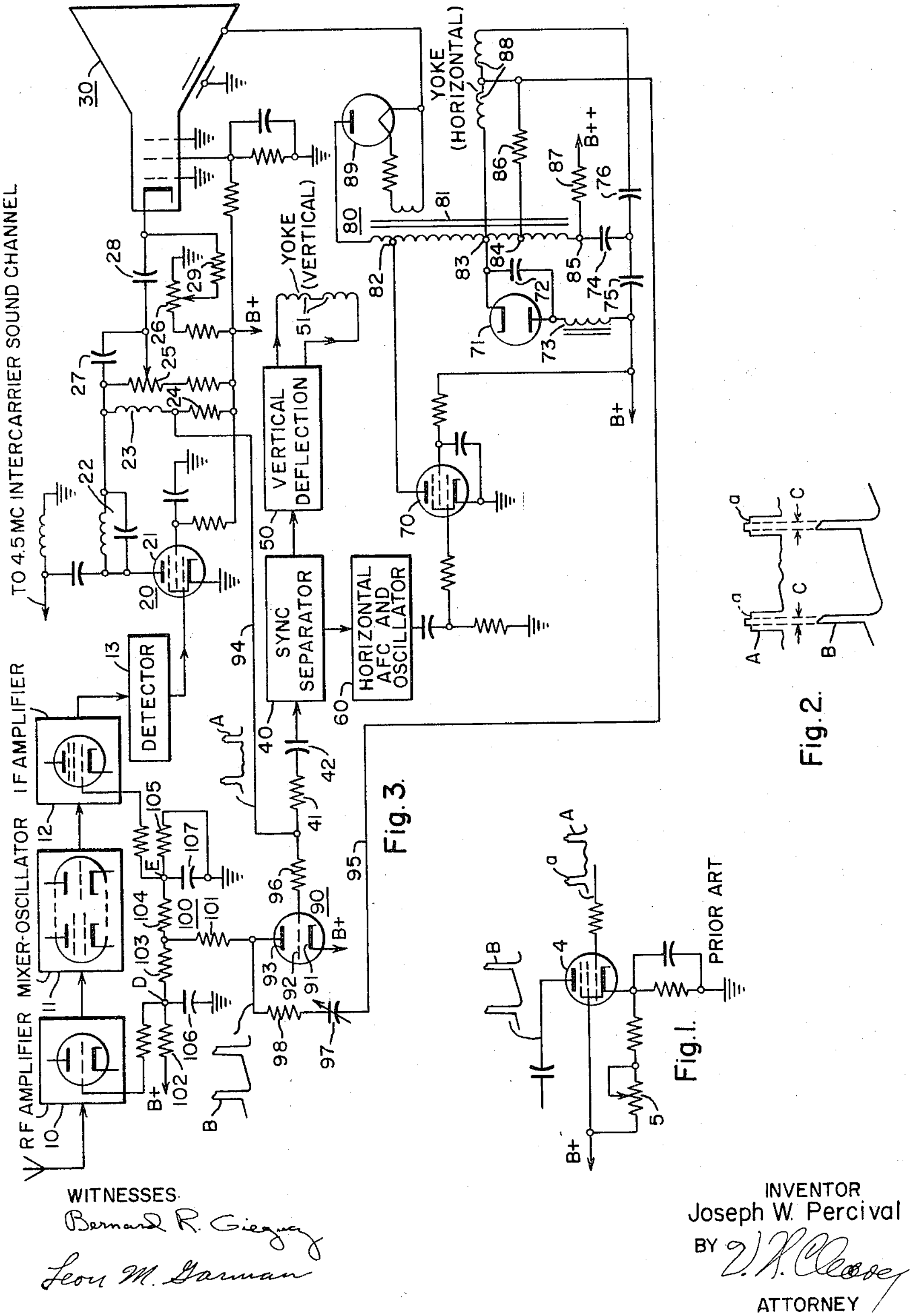
FIGURE 1 illustrates an example of prior art of the keying tube for gated A.G.C. for a television receiver.
FIG. 2 illustrates a time graph of the signals employed for rendering a gated A.G.C. tube conductive.
FIG. 3 illustrates a television receiver utilizing gated A.G.C. embodying the invention.

In conventional gated A.G.C. circuits for television receivers, video information including the horizontal sync pulses and flyback pulses are applied to a gating tube so that when time coincidence between the horizontal sync pulses and the flyback pulses, occur, the tube will conduct and provide a signal representative of the strength of the station being received. This signal then is filtered resulting in a variable D.C. signal and is usually applied to the radio frequency amplifier circuit and one or more of the IF amplifiers. In such a conventional system it is desirable to enable adjustment of the amount of A.G.C. developed by the gating tube so as to enable an optimum amount of attenuation of both weak and strong signals by the A.G.C. circuit. More specifically, the A.G.C. system can be adjusted so that on strong received signals the received signal does not overdrive the receiver and limit or crush the sync pulses so as to result in picture distortion and at the same time provide maximum amplification of weak signals. In a conventional type system the gated or gating tube has a video information with horizontal sync pulses as well as flyback pulses being applied to the tube. In order to provide for the above adjustment, the static D.C. voltage or bias applied between two of the elements of the gating tube, usually the cathode and the control is varied so as to provide the correct amount of attenuation to both strong and weak signals.

FIG. 1 illustrates a prior art gated A.G.C. tube 4. As shown in FIGS. 1 and 2, the received video signal illustrated as (A) with positive going horizontal sync pulses (*a*) is applied to the control grid of tube 4 whereas the flyback pulses (B) occurring during retrace, are applied to the plate of the tube 4. In the particular gating tube shown, the suppressor grid of the tube 4 is maintained at cathode potential and the voltage between the cathode and the control grid of the cutoff tube 4 is varied by a variable resistor 5. As can be seen from this circuit numerous electrical connections and components are required for the pentode cutoff tube to provide the A.G.C. voltage. When the potentiometer 5 is varied to change the voltage between the cathode and the control grid of tube 4 this varies the A.G.C. voltage effected by the gating tube 4. As shown in FIG. 2, during time coincidence of these pulses, shown as time period C, the gating tube of the A.G.C. circuit will fire or be conductive. This signal is then applied to the television receiving channel to govern the gain of the channel.

FIG. 3 illustrates a television set having a gated A.G.C. circuit embodying the invention. More specifically the television receiver includes a conventional receiving channel comprising an RF amplifier 10 which receives the television signals from an antenna. After being amplified in amplifier 10 the signal is then fed to a mixer oscillator 11 of the conventional type to provide an output of the intermediate frequency of 44 megacycles. The output of the mixer oscillator 11 is then fed to an intermediate frequency amplifier shown diagrammatically as 12. It will be understood that more than one intermediate frequency amplifier can be used. The output of the intermediate frequency amplifier stage 12 is fed to a detector 13 for demodulating the composite video signal. After demodulation by the detector 13 the signal is then fed to a conventional video amplifier 20 having a pentode 21. As in most conventional video output stages, the 4.5 megacycle intercarrier sound signal is developed in a resonant tank circuit 22 to feed a 4.5 megacycle intercarrier sound channel to reproduce the sound of the composite video signal. Connected between this tank 22 and B+ is an alternating current voltage divider including an inductor 23 and a resistor 24. Conventionally between the same terminals is a variable voltage and contrast control 25. Connected between the B+ or direct voltage supply and ground is a variable brightness control 26 with the wiper of brightness control 26 being connected through a resistor 29 to the cathode of a cathode ray tube 30. The wiper of potentiometer 25 is connected to the cathode of the C.R.T. tube 30. A peaking capacitor 27 is also connected between the wiper of potentiometer 25 and the 4.5 megacycle trap 22.

The foregoing description is by way of illustration of a conventional television receiver and the details of this are so well known in the art that it is felt that a more detailed description is unnecessary. A conductor 94 is connected at one end to a point between inductor 23 and resistor 24 to provide composite video signal through a resistor 41 and a coupling capacitor 42, to a sync separator 40. The output of this separator which provides the synchronizing pulses which separates the synchronizing pulses from the video signal, is fed to a vertical deflection circuit to provide the necessary vertical deflection for the cathode ray tube 30. The output of the vertical deflection circuit is fed to deflection coils 51 so as to effect necessary vertical deflection of the electron beam of cathode ray tube 30. The horizontal sync pulses are fed from the sync separator 40 to a horizontal automatic frequency control in oscillator 60. The horizontal deflection signal is then fed to a horizontal output stage so as to provide the necessary horizontal deflection of the electron beam for the cathode ray tube 30. This horizontal output circuit includes a pentode 70 the signal of which is applied across a so-called flyback transformer 80. The flyback transformer 80 includes a core 81 and is generally of the autotransformer type. The flyback transformer 80 has a first tap 82 connected to the anode of pentode 70. The second tap of this flyback transformer is connected to a shunt combination of the capacitor 72 and a diode 71. The other end of this shunt combination or parallel combination is connected through a choke 73 to the B+ supply for the television receiver. The second tap 83 of the autotransformer 80 is connected to one side of the series connected horizontal deflection coils 88. The midpoint of these two deflection coils 88 are connected through a resistor 86 to a third tap 84 on the autotransformer 80. The other end of the other deflection coil 88 is connected to a fourth tap 85 of the transformer 80 through capacitors 76 and 74. A resistor 87 is connected between the fourth tap 85 of the transformer 80 so as to develop a so-called B boost voltage for supply to various portions of the set such as the FM detector and vertical multivibrator.

The above description of the horizontal and vertical deflection circuit is merely a description of a conventional circuit and further details of the operation thereof is felt to be unnecessary.

In the present invention, a gated A.G.C. tube 90 is employed which is a triode. The cathode 91 of the triode 90 is connected to the B+ supply of the television receiver. The control grid 92 is connected through the resistor 96 to conductor 94 so as to supply the video signal A with positive going sync pulses ($a$) to the control grid 92. The flyback pulses B are applied to the anode 93 of triode 90 through conductor 95, a variable capacitor 97 and a resistor 98. As shown in FIG. 3 the conductor 95 is connected to the resistor 86.

The anode of triode 90 is connected through a resistor 101 to a filtering network to convert the periodic conduction current of tube 90 into a negative going variable D.C. signal which varies in accordance with the strength of the received sync pulses ($a$). More specifically, the resistor 101 connects plate 93 to the midpoint connection of series connected resistors 103 and 104. As shown in FIG. 3 another resistor 102 is connected to a resistor 103 with capacitor 106 connected between these resistors to ground. The resistor 102 can be as is well known connected to a B+ supply to provide a delayed voltage A.G.C. at point D which can then there be applied through a resistor to the grid of the radio frequency amplifier 10. At potential point E, between series connected resistors 104 and 105, a capacitor 107 is connected to ground. The other end of resistor 105 is also connected to ground. Therefore, an A.G.C. voltage at point E can be, as is customary, connected to the grid of an IF amplifier through a resistor, to provide an A.G.C. voltage thereto. The filter and/or delayed A.G.C. circuit described is meant only by way of an example of a conventional method of utilizing the negative going potential developed by the gating tube made. Various other means of filtering and applying the resultant A.G.C. signal to the television receiving channel can be utilized.

In the present invention, as is in conventional A.G.C. tubes, the flyback pulse B are applied to the anode 93 of the gating tube 90 whereas the video signal A with its horizontal synchronizing pulses ($a$) is applied to the control grid 92 of the tube. When as shown in FIG. 2, there is time coincidence between the horizontal sync pulses ($a$) and the flyback pulses (B) the tube 90 will conduct to thereby develop a negative control voltage at the anode 93. As discussed above however, it is frequently desirable to employ an adjustment so that the amplitude of the A.G.C. signal developed by tube 90 can be varied so as to provide optimum attenuation by the A.G.C. circuit. In the present invention the horizontal flyback pulses (B) are to the anode 93 through a variable capacitance 97. By adjusting this variable capacitance the amplitude of the flyback pulses applied to anode 93 can be varied to thereby result in varying the A.G.C. current resulting from the conduction of triode tube 90 during the periods C. The variable capacitor 97 can be relatively low capacitance and effectively this variable capacitor replaces the potentiometer 5, the B+ connection to the screen grid of tube 4 shown in FIG. 1 as well as the cathode resistor and capacitor. Hence, it will be seen that this variable capacitor enables the use of a triode A.G.C. tube which will conduct in response to the anode voltage and also replaces as can be seen a substantial number of connections and electrical components. More specifically by varying the flyback pulses by capacitor 97 a triode A.G.C. tube can be employed satisfactorily along with a minimum number of other connections.

A typical example of the A.G.C. tube 90 shown in FIG. 3, which is found to work satisfactorily is the triode section of a 6CL8A with the cathode connected to 135 volts B+ resistor 98 being 100K and variable capacitor varying between 3 and 25 micromicrofarads. The applied pulse B would have a peak-to-peak voltage of approximately 400 volts, whereas the video applied to the grid 92 would have a peak-to-peak voltage of approximately 70 volts.

While I have indicated and described an embodiment for carrying my invention into effect, it will be apparent to one skilled in the art that my invention is by no means limited to the particular embodiment illustrated and modifications may be made without departing from the scope and the spirit of the invention.

I claim as my invention:

1. A television receiver adapted to receive a television signal modulated by video signal components and periodic synchronizing-signal components, a signal channel including means for demodulating said television signal to obtain said video signal components and said synchronizing signal components, said synchronizing components defining a retrace interval, means for developing trigger pulses during said retrace interval, an automatic gain control circuit including an electric valve means, means applying said trigger pulses to said valve means including variable reactance means to vary the amplitude of said trigger pulses, and said valve means responsive to time coincidence of said trigger pulses and said synchronizing signal components to apply an automatic gain control signal to said receiver.

2. A television receiver adapted to receive a television signal modulated by video signal components and periodic synchronizing signal components, a signal channel including means for demodulating said television signal to obtai said video signal components and said synchronizing signal components, said synchronizing components defining a retrace internal, means for developing trigger pulses during said retrace interval, an automatic gain control circuit including an electric valve means having a cathode electrode, a control electrode and an anode electrode, means applying said synchronizing signal components to said control electrode, means applying said trigger pulses to said anode electrode including variable reactance means to vary the amplitude of said trigger pulses, and said valve means responsive to time coincidence of said trigger pulses and said synchronizing signal components to apply an automatic gain control to said signal channel.

3. A television receiver adapted to receive a television signal modulated by video signal components in periodic synchronizing signal components, a signal channel including means for demodulating said television signal to obtain said video signal components and said synchronizing signal components, said synchronizing components defining a retrace interval, means for developing trigger pulses during said retrace interval, an automatic gain control circuit including an electric valve means having a cathode, a control electrode and an anode electrode, means supplying said synchronizing signal components to said control electrode, means applying said trigger pulses to said anode electrode including variable capacitance means to vary the amplitude of said trigger pulses; and said valve means responsive to time coincidence of said trigger pulses and said synchronizing signal components to apply an automatic gain control signal to said signal channel.

4. A television receiver adapted to receive a television signal modulated by video signal components and periodic synchronizing signal components, a signal channel including means for demodulating said television signal to obtain said video signal components and said synchronizing signal components, said synchronizing signal components defining a retrace interval, a cathode ray tube, a deflection system including a deflection coil associated with said tube for producing a beam deflecting magnetic field therein, a source of scanning current, a transformer having a core coupling said source to said deflection coil, an automatic gain control circuit including an electric valve means having a cathode electrode, a control electrode and an anode electrode, means for developing trigger pulses during said retrace interval comprising means coupling said transformer to said anode electrode including variable reactance means to vary the amplitude of said trigger pulses, means applying said synchronizing components to said control electrode, and said valve means responsive to time coincidence of said trigger pulses and said synchronizing signal components to apply an automatic gain control signal to said signal channel.

5. A television receiver adapted to receive a television signal modulated by video signal components and periodic synchronizing signal components, a signal channel including means for demodulating said television signal to obtain said video signal components and said synchronizing signal components, said synchronizing components defining a retrace interval, a cathode ray tube, a horizontal deflection system including the horizontal deflection coil associated with said tube for producing a horizontal beam deflecting magnetic field therein, a source of scanning waveform current, a flyback transformer coupling said source to said deflection coil, an automatic gain control circuit including an electric valve means having a cathode electrode, a control electrode and an anode electrode, means applying said trigger pulses to said anode electrode including variable capacitance means to vary the amplitude of said trigger pulses, means for applying said synchronizing signal components to said control electrode, and said valve means responsive to time coincidence of said trigger pulses in said synchronizing signal components to apply an automatic gain control signal to said signal channel.

No references cited.

DAVID G. REDINBAUGH, *Primary Examiner.*

J. McHUGH, *Assistant Examiner.*